United States Patent
Yanagisawa

[19]

[11] Patent Number: 5,772,809
[45] Date of Patent: Jun. 30, 1998

[54] PNEUMATIC TIRES WITH SPECIFIED STEEL BELT CORDS

[75] Inventor: Manabu Yanagisawa, Kodaira, Japan

[73] Assignee: Bridgestone Corporation, Tokyo, Japan

[21] Appl. No.: 760,597

[22] Filed: Dec. 4, 1996

[30]     Foreign Application Priority Data

Feb. 23, 1996  [JP]  Japan .................................. 8-036496
Jun. 5, 1996   [JP]  Japan .................................. 8-142475

[51] Int. Cl.$^6$ .............................. B60C 9/20; B60C 9/18; B60C 9/00; D07B 1/06
[52] U.S. Cl. .......................... 152/527; 57/206; 57/236; 57/311; 57/902; 152/451; 152/537
[58] Field of Search .................................. 152/527, 451, 152/537; 57/902, 206, 236, 311

[56]           References Cited

U.S. PATENT DOCUMENTS 4,606,392  8/1986  Weidenhaupt et al. ............. 152/527 X

FOREIGN PATENT DOCUMENTS 0 146 046   6/1985   European Pat. Off. .
0 363 893   4/1990   European Pat. Off. .
2 546 922  12/1984   France .................................... 57/236
1-162885    6/1989   Japan ..................................... 57/902
WO/91/14811 10/1991  WIPO .

OTHER PUBLICATIONS

Patent Abstracts of Japan, 06073672, Mar. 15, 1994 (Tokyo Seiko Co Ltd).

*Primary Examiner*—Adrienne C. Johnstone
*Attorney, Agent, or Firm*—Sughrue, Mion, Zinn, Macpeak & Seas, PLLC

[57]            ABSTRACT

A pneumatic tire comprises a carcass toroidally extending between a pair of bead portions and a belt arranged outside the carcass in a radial direction of the tire and composed of at least one belt layer, in which the belt layer is made from a plurality of steel cords, each cord being formed by twisting 2 to 4 filament bundles each consisting of two steel filaments paralleled with each other so as to have a structure that major axes of the filament bundles constituting the cord are set toward substantially the same direction. In the belt layer, the major axes of the filament bundles in the cords constituting the belt layer are arranged substantially in a row in a widthwise direction of the belt.

5 Claims, 6 Drawing Sheets

FIG_1

FIG_2a

FIG_2b

FIG_2c

FIG_2d

FIG_5

FIG_6

FIG_7

FIG_8a

FIG_8b

FIG_9

FIG_10

FIG_11

FIG_12a

FIG_12b

FIG. 13
COMPARATIVE

FIG. 14
COMPARATIVE

FIG. 15
COMPARATIVE

FIG. 16
COMPARATIVE

FIG. 17
COMPARATIVE

5,772,809

PNEUMATIC TIRES WITH SPECIFIED STEEL BELT CORDS

BACKGROUND OF THE INVENTION

1. Field of the Invention

This invention relates to a pneumatic tire having an improved steering stability without sacrificing durability.

2. Description of Related Art

As a factor lowering the durability of the pneumatic tire, there is known a separation failure where water enters from an outside of the tire through cut failure or the like into a belt or the like arranged in the inside of the tire to cause a corrosion of cords arranged in the belt. Then the corrosion region is widened to cause the peeling between cord and rubber. In order to avoid the occurrence of separation failure, it is effective to have a structure where rubber is sufficiently penetrated into the inside of the cord so as not to form a space propagating water between filaments constituting the cord, or so-called rubber penetration structure. Such a rubber penetration structure is attained by loosely twisting the filaments to make the space between the filaments constituting the cord large and hence easily penetrate rubber thereinto, and is particularly suitable for single twisted cord of 1×3 or 1×5 structure.

On the other hand, the cords having the rubber penetration structure have a large space between the filaments constituting the cord, so that they are small in the modulus of elasticity as compared with the conventionally known cords having no space between filaments. Therefore, when the cords having the rubber penetration structure are applied to the belt of the tire, the tensile rigidity of the belt is naturally lowered to bring about the deterioration of the steering stability of the tire. Moreover, it is possible to ensure the tensile rigidity of the belt by increasing the end count of the cords in the belt, which results in the increase of the tire weight and narrows the distance between adjacent cords in the belt. Consequently, rubber separation starting from a cord end located at the end portion of the belt in widthwise direction is easily propagated to another cord adjacent thereto to bring about the occurrence of so-called belt end separation.

SUMMARY OF THE INVENTION

It is, therefore, an object of the invention to provide a pneumatic tire having an improved steering stability without lowering the durability of the tire due to the occurrence of separation failure in the belt and its surrounding.

According to the invention, there is the provision of a pneumatic tire comprising a carcass toroidally extending between a pair of bead portions and a belt arranged outside the carcass in a radial direction of the tire and composed of at least one belt layer, in which said belt layer is constituted by arranging a plurality of steel cords, each cord being formed by twisting 2 to 4 filament bundles each consisting of two steel filaments parallel with each other so as to have a structure that major axes of the filament bundles constituting the cord are set toward substantially the same direction, in such a manner that the major axes of the filament bundles in the cords constituting the belt layer are arranged substantially in a row in a widthwise direction of the belt.

BRIEF DESCRIPTION OF THE DRAWINGS

The invention will be described with reference to the accompanying drawings, wherein:

FIG. 3 is a partially and diagrammatically sectional view of a first embodiment of the belt according to the invention using the steel cords shown in FIG. 2a;

DESCRIPTION OF PREFERRED EMBODIMENTS

Figure 1:
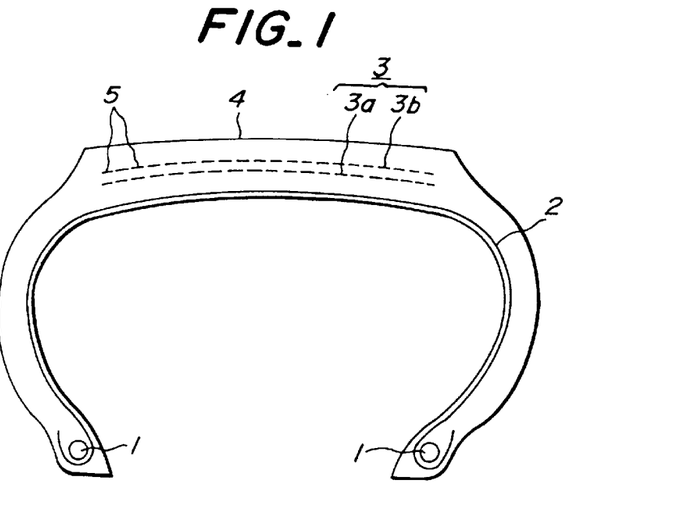
FIG. 1 is a diagrammatically sectional view of an embodiment of the pneumatic tire according to the invention.

In FIG. 1 is shown a concrete embodiment of the pneumatic tire according to the invention. This pneumatic tire comprises a carcass 2 toroidally extending between a pair of bead cores 1, a belt 3 superimposed about a crown portion of the carcass 2 in a radial direction of the tire and comprised of, for example, two belt layers 3a, 3b, and a tread 4 arranged outside the belt 3 in the radial direction of the tire. The steel cords 5 as shown in FIG. 2a are included in the belt 3 in a given arrangement.

Figure 2A:
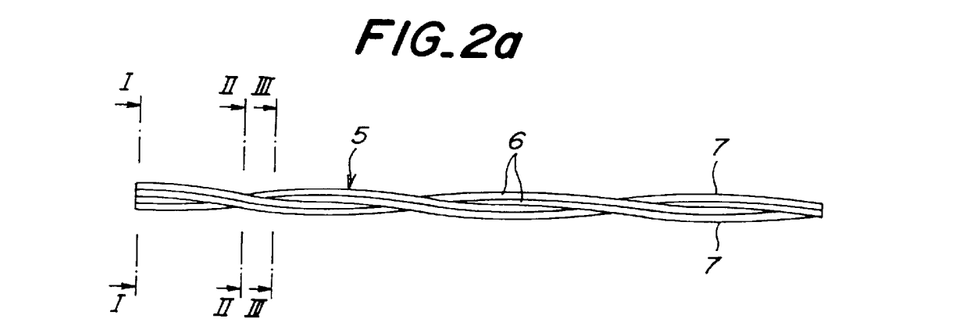
FIG. 2a is a plan view of a first embodiment of the steel cord according to the invention.
Figure 2B:
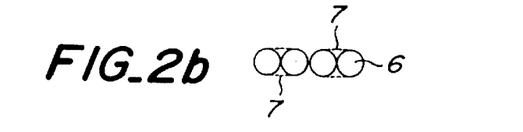
FIGS. 2b to 2d are diagrammatically sectional views taken along lines I—I, II—II and III—III in FIG. 2a, respectively.
Figure 2C:
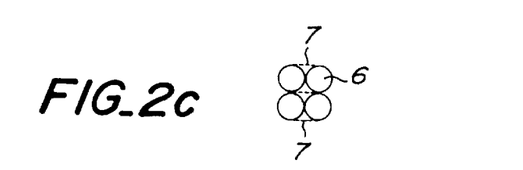
Figure 2D:
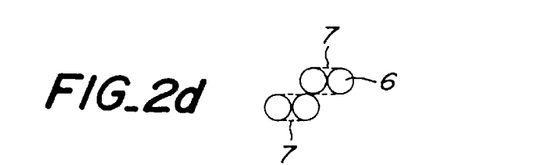
Figure 3:
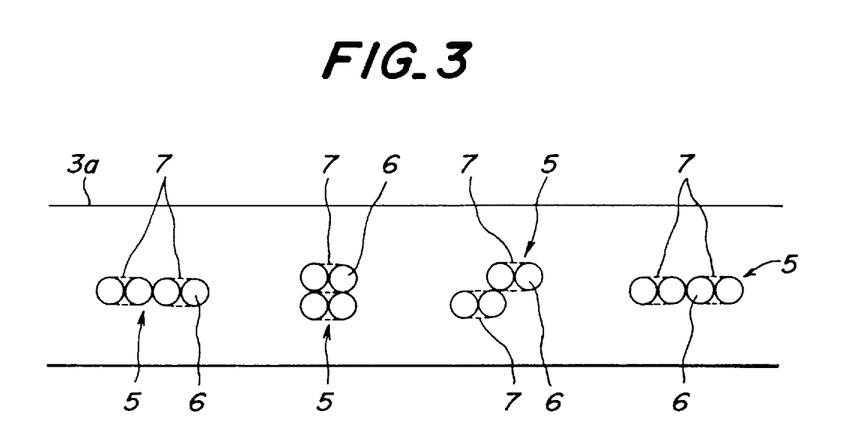

The steel cord 5 shown in FIG. 2a is formed by twisting two filament bundles 7 each consisting of two steel filaments 6 parallel to each other so as to have a structure that major axes of the filament bundles 7 constituting the cord 5 are set toward the same direction as shown in FIGS. 2b to 2d. When the steel cords 5 are applied to the belt layer 3a, 3b constituting the belt 3, as shown in FIG. 3, they are arranged in such a manner that the major axes of the filament bundles 7 in the cords 5 constituting the belt layers 3a, 3b are arranged substantially in a row in the widthwise direction of the belt 3.

Figure 4A:
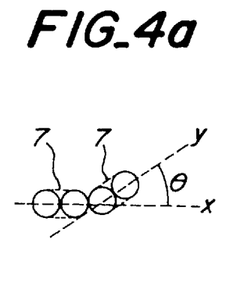
FIGS. 4a to 4c are diagrammatically sectional views of a second embodiment of the steel cord according to the invention.
Figure 4B:
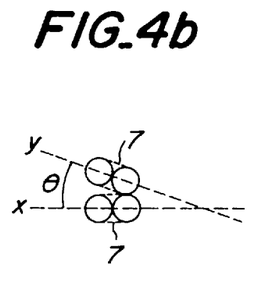
Figure 4C:
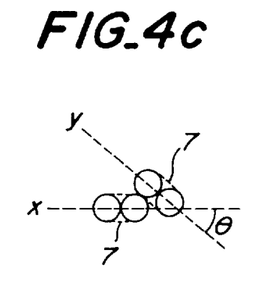

Moreover, the cord 5 shown in FIG. 2a has an arrangement such that all major axes of the filament bundles 7 are set toward the same direction as seen from FIGS. 2b to 2d. In the invention, however, it is not necessary to completely match the directions of the major axes of the filament bundles 7 with each other. In the latter case, as the sections of the cord corresponding to the same positions in the longitudinal direction of the cord as shown in FIG. 2a are shown in FIGS. 4a to 4c, it is acceptable that a crossing angle θ defined between a direction x of a major axis of a filament bundle 7 constituting the cord and a direction y of a major axis of another filament bundle 7 constituting the same cord is kept away from 90°, or the crossing angle θ is concretely not more than 50°. This is applicable even in cords consisting of 3–4 filament bundles as shown in FIGS. 6–9. In any case, the crossing angle θ defined between the directions of the major axes of the filament bundles are not more than 50°.

Figure 5:
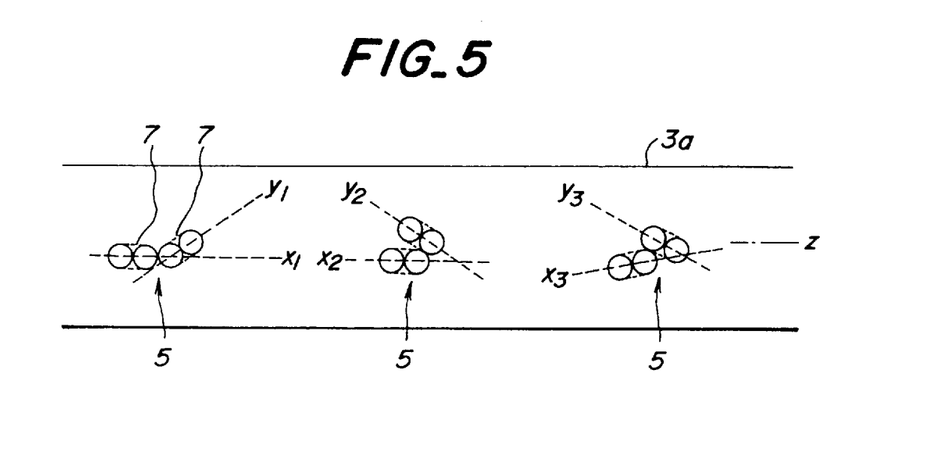
FIG. 5 is a partially and diagrammatically sectional view of a second embodiment of the belt according to the invention using the steel cords shown in FIG. 4.

When the steel cords 5 having the structure as shown in FIG. 4 are applied to the belt layer 3a, 3b constituting the belt 3, as shown in FIG. 5, it is acceptable that either major axis direction x or major axis direction y or both of the filament bundles 7 constituting the cord 5 is arranged at an inclination angle of not more than 50° with respect to the widthwise direction z of the belt. This is the use of the steel cord as shown in FIG. 2. Moreover, the directions $x_1, x_2, x_3$ and/or the directions $y_1, y_2, y_3$ in the adjoining cords are not necessarily required to fall in line with each other. This is also applicable in the steel cords consisting of 3–4 filament bundles as shown in FIGS. 6–9.

Figures 6, 7:
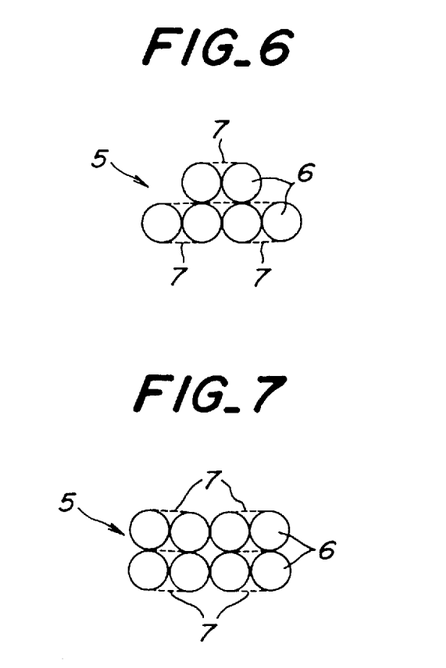
FIG. 6 is a diagrammatically sectional view of a second embodiment of the steel cord according to the invention.
FIG. 7 is a diagrammatically sectional view of a third embodiment of the steel cord according to the invention.

The steel cords 5 shown in FIGS. 6 and 7 are formed by twisting three or four filament bundles 7 each consisting two steel filaments 6 parallel to each other so as to have a structure that major axes of these filament bundles constituting the cord are set toward the same direction likewise the case of FIG. 2. These steel cords 5 are applied to the belt of the tire in such a manner that the major axes of the filament bundles 7 in the cords constituting the belt layer are arranged substantially in a row in the widthwise direction of the belt.

In the invention, the belt of the tire is reinforced with the steel cords each formed by twisting 2–4 filament bundles each consisting of 2 steel filaments parallel to each other so as to have a structure that the major axes of the filament bundles constituting the cord are set toward substantially the same direction, whereby the bending rigidity in the direction of the major axis is increased and the bending rigidity in the direction of the minor axis is decreased to give an anisotropy of the rigidity to the cord.

Since the bending rigidity in the direction of the major axis is high in the steel cord formed by twisting the 2–4 filament bundles so as to set the major axes of the filament bundles toward the same direction, when in-plane bending deformation is applied to the belt during the cornering, the rigid feeling of the tire is enhanced to improve the steering stability of the vehicle.

When the steel cords according to the invention are applied to the belt, it is important that the major axes of the filament bundles in the cords constituting the belt are arranged substantially in a row in the widthwise direction of the belt. If the major axis of the filament bundle constituting the cord is existent in a direction crossing the widthwise direction of the belt, strain concentrates in such a filament bundle due to out-of-plane bending deformation caused in a direction perpendicular to the surface of the belt such as buckling deformation or the like created in a ground contact region of the tire during the cornering of the vehicle and hence the local strain increases in the cord to result in cord breakage as such a phenomenon is repeated every the cornering. According to the invention, the local concentration of strain due to the out-of-plane bending deformation can be avoided by arranging the major axes of the filament bundles in the cords constituting the belt substantially in a row in the widthwise direction of the belt, whereby the durability of cord and hence the tire durability can be improved.

Figure 8A:
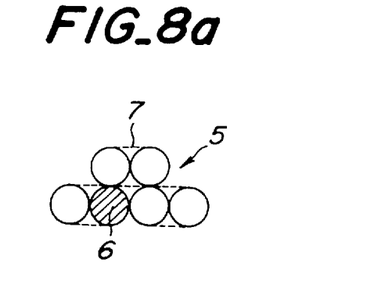
FIGS. 8a and 8b are diagrammatically sectional views illustrating the twisted states of filament bundles taken at certain positions in a longitudinal direction of the cord shown in FIG. 7, respectively.
Figure 8B:
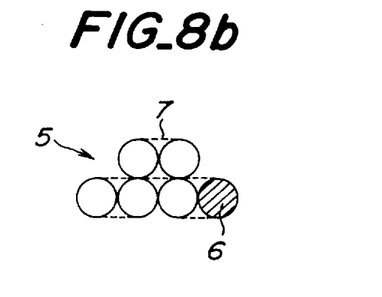

Further, the constitutional element of the steel cord according to the invention is not a monofilament but is a filament bundle consisting of two steel filaments, so that even when the steel cord is particularly comprised of three or four filament bundles, a closed space, inevitably formed between the filaments, is not continuous in the longitudinal direction of the cord as compared with the case of the conventional single-twisted cord and hence the rubber penetration structure can easily be attained. That is, when the steel cord 5 shown in FIG. 6 is formed by twisting three filament bundles 7, a hitched steel filament 6 forming a closed space at a position of FIG. 8a is located outward at a position of FIG. 8b separated from the position of FIG. 8a in the longitudinal direction of the cord and hence the closed space is not formed at the position of FIG. 8b. As a result, the closed space is not continuous in the longitudinal direction of the cord and hence the space of penetrating rubber inside the cord is always formed.

When the number of steel filaments in the filament bundle is 3 or more, a spiral orbit of the filament bundle in the cord spreads in the widthwise direction of the belt, so that strain locally concentrates in the filament bundle through the in-plane bending deformation of the belt or the bending deformation along the plane thereof. Also, when tension is applied to the cord, the parallel arrangement of the filaments in the filament bundle is apt to be broken, which results in the lowering of the rigidity in the cord.

The reason why the steel cord is constructed with 2–4 filament bundles is due to the fact that when the cord consists of the single filament bundle, it is obliged to increase the end count for ensuring the belt rigidity and hence the control of the aforementioned belt end separation is obstructed and also the steel filaments in the filament bundle are easily scattered to lower the operability in the production of the tire. While when the cord is comprised of 5 or more filament bundles, the total number of the steel filaments in the cord becomes large and hence the penetration of rubber into the inside of the cord is difficult and the belt rigidity is too high to degrade ride comfortability.

When the 2–4 filament bundles are twisted under the above arrangement, it is preferred that a ratio P/d of twisting pitch of the filament bundle (P, mm) to filament diameter (d, mm) is not less than 50. When the ratio P/d is less than 50, the twisting angle becomes larger to decrease the modulus of elasticity of the cord and hence the tensile rigidity of the belt is lowered to degrade the steering stability of the tire.

Figure 9:
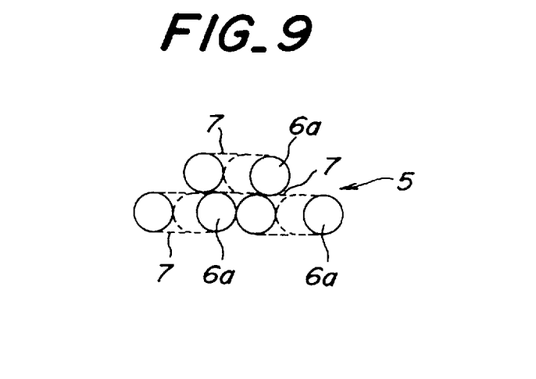
FIG. 9 is a diagrammatically sectional view of a modified embodiment of the steel cord shown in FIG. 7.
Figure 10:
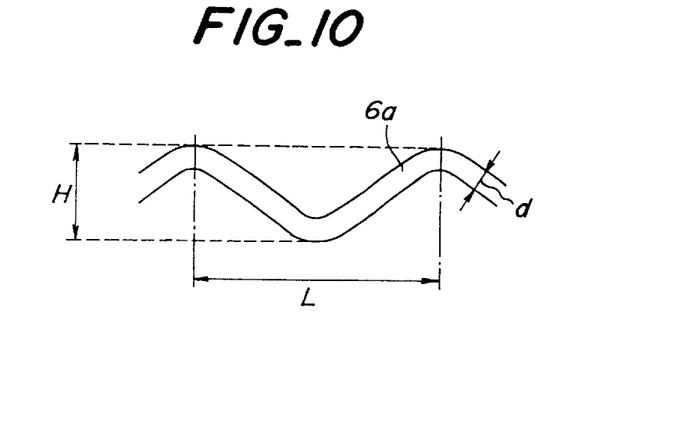
FIG. 10 is a schematically and partially plan view of a wavy-formed filament used in a filament bundle constituting the cord shown in FIG. 9.

In order to further promote the penetration of rubber into the inside of the cord, it is effective that at least one steel filament 6a constituting the filament bundle is subjected to wavy forming to positively ensure the space between the filaments in the filament bundle as shown in FIG. 9. Moreover, the wave shape applied to the filament should preferably have a wave height (H) of $H \leq 3d$ and a wave length (L) of $L \geq 10d$ when the filament diameter is d as shown in FIG. 10. When $H > 3d$, the wave shape formed becomes larger and hence the fatigue property and rigidity of the cord lowers. On the other hand, when $L < 10d$, the forming pitch of the wave shape becomes small and hence the fatigue property and strength of the cord lowers.

Figure 11:
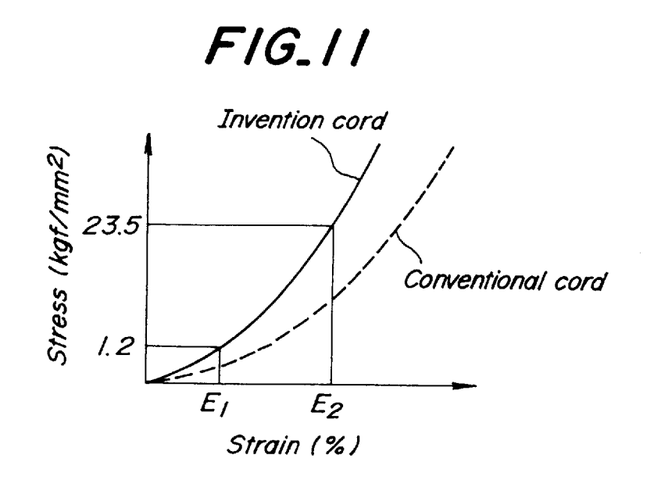
FIG. 11 is a graph showing a stress-strain curve of the cord.

In the steel cord formed by twisting 2–4 filament bundles so as to have a structure that major axes of the filament bundles constituting the cord are set toward substantially the same direction, it is preferable that a difference $E_D$ between strain at a tensile stress of 23.5 kgf/mm² and strain at a tensile stress of 1.2 kgf/mm² is within a range of 0.11–0.25% when a tensile stress applied to the cord as a reinforcing member for the tire is a range of 1.2–23.5 kgf/mm² during the usual running of the vehicle. That is, when $E_D$ is within a range of 0.11–0.25%, a stress-strain curve as shown by a solid line in FIG. 11 is obtained. When this stress-strain curve is compared with a stress-strain curve of the conventional 1×5 twisting structure as shown by dotted lines in FIG. 11, the rising of gradient in the stress-strain curve becomes faster and hence the initial modulus of the cord is high and the belt rigidity is enhanced by these cords and the dimensional stability of the tire is improved. When the value of $E_D$ ($E_2-E_1$ in FIG. 11) exceeds 0.25%, the closing space between the filament bundles through twisting is created to facilitate the stretching of the cord and hence the belt rigidity lowers. A value of $E_D$ of less than 0.11% is physically impossible.

Moreover, the steel cords having $E_D$ of 0.11–0.25% may be produced by a method of subjecting the filament bundle to a forming, a method of twisting the filament bundles under tension, or the like.

Figure 12A:
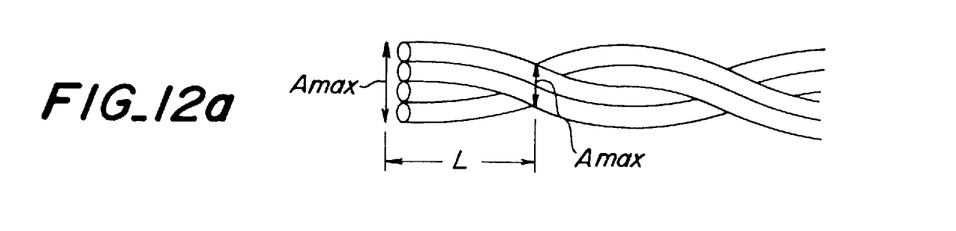
FIGS. 12a and 12b are schematic views illustrating changes of cord size in the twisting of two filament bundles for the formation of the cord according to the invention.
Figure 12B:
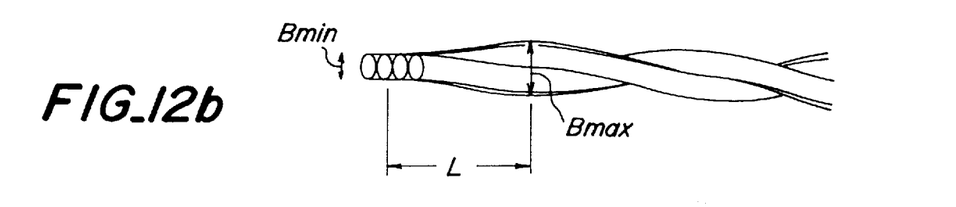

When the two filament bundles are twisted so as to have a structure that major axes of the filament bundles are set toward substantially the same direction, the size of the resulting cord variously changes in the longitudinal direction of the cord. When the average size of the cord becomes greatest at A-plane as shown in FIG. 12a, maximum value $A_{max}$ and minimum value $A_{min}$ are alternately shown at pitch L in the longitudinal direction of the cord. When the average size of the cord becomes smallest at B-plane as shown in FIG. 12b, maximum value $B_{max}$ and minimum value $B_{min}$ are alternately shown at the pitch L in the longitudinal direction of the cord, and also the relations between $A_{max}$ and $B_{min}$ and between $A_{min}$ and $B_{max}$ are maintained at the respective positions in the longitudinal direction. In these relations, the cord is preferable to satisfy the following equations (1)–(3):

$$1.5 \leq A_{max}/A_{min} \leq 2.5 \quad (1)$$

$$1.5 \leq B_{max}/B_{min} \leq 2.5 \quad (2)$$

$$3.0 < A_{max}/B_{min} \leq 5.0 \quad (3)$$

When the value of $A_{max}/A_{min}$ or $B_{max}/B_{min}$ is less than 1.5, the side face of the cord is not waved and hence rubber cracking is easily propagated along the cord to obstruct the resistance to the separation failure. When the value of $A_{max}/A_{min}$ or $B_{max}/B_{min}$ exceeds 2.5, the waving degree in the side face of the cord is too large and hence the cords of the adjoining belt layers rub to lower the fatigue property of the cord. Also the closing space in the cord through twisting is created and it may be difficult to control the value of the $E_D$ to not more than the upper limit. On the other hand, when the value of $A_{max}/B_{min}$ is less than 3.0, the flatness degree of the cord becomes small and it is difficult to ensure the in-plane rigidity when such cords are used in the belt layer of the tire. When the value of $A_{max}/B_{min}$ exceeds 5.0, the flatness degree of the cord becomes inversely large and hence the cords of the adjoining belt layers are rubbed to lower the fatigue property of the cord.

Further, it is favorable that the cord having the structure shown in FIG. 12 satisfies the following relations (4) and (5) with respect to the appearing pitch L:

$$5 \leq L/A_{min} \leq 20 \quad (4)$$

$$15 \leq L/B_{min} \leq 40 \quad (5)$$

When the value of $L/A_{min}$ is less than 5 or the value of $L/B_{min}$ is less than 15, the pitch L becomes too short to make the deformation degree of the cord large and hence degrade the fatigue property, and also the cord is easily stretched by the shortening of the pitch to degrade the belt rigidity. On the other hand, when the value of $L/A_{min}$ exceeds 20 or the value of $L/B_{min}$ exceeds 40, the waved pitch of the side face of the cord becomes longer and hence the rubber cracking is easily propagated along the cord to degrade the resistance to separation failure.

Moreover, the steel cords according to the invention are applied to the belt in the tire by covering them with a coating rubber. In this case, the coating rubber is preferable to have a 100% modulus of not less than 40 kgf/mm² in order to sufficiently develop the performance of the cord to enhance the belt rigidity and improve the steering stability of the tire.

The following examples are given in illustration of the invention and are not intended as limitations thereof.

Steel cords having structures as shown in FIGS. 2, 4, 6, 9 and 13–17 are produced by using steel filaments having various diameters according to a specification as shown in Table 1. A tire having a structure shown in FIG. 1 and having a tire size of 185/70R14 is prepared by using each kind of steel cords in a belt at an end count shown in Table 1. Moreover, the belt 3 consists of a first belt layer 3a arranged on the carcass 2 and containing steel cords inclined at a cord angle of 22° upward to the left with respect to an equatorial plane of the tire and a second belt layer 3b arranged thereon and containing steel cords inclined at a cord angle of 22° upward to the right with respect to the equatorial plane.

Each of the thus obtained tires is mounted onto a standard rim and inflated under a standard internal pressure, which is mounted onto a passenger car and run on a paved road over a distance of 50,000 km. Thereafter, the belt is taken out from the tire to measure the number of cords broken, crack length at the belt end, and corrosion length of the cord from cut failure. Furthermore, the steering stability and ride comfortability are evaluated by the feeling of three professional drivers after the running over 50,000 km. The feeling evaluation is carried out by ten point process and an average value is calculated from the evaluation points of the drivers. The results are also shown in Table 1.

TABLE 1

Figure 13:
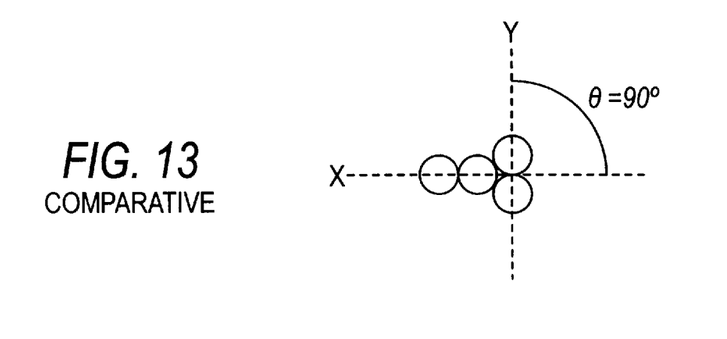
FIGS. 13 to 17 are diagrammatically sectional views of various comparative embodiments of the steel cord, respectively.
Figure 14:
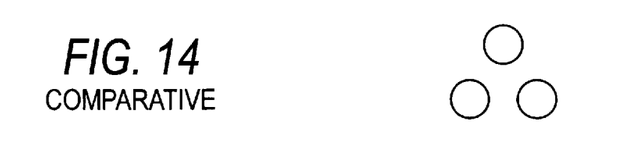
Figure 15:
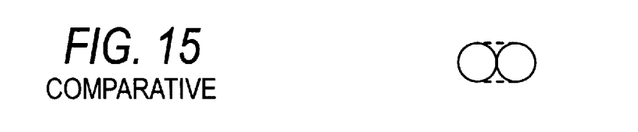
Figure 16:
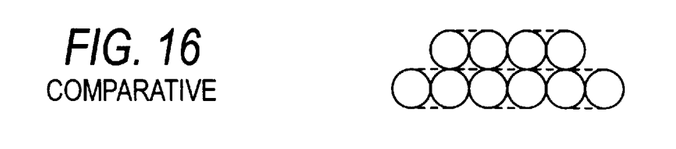
Figure 17:
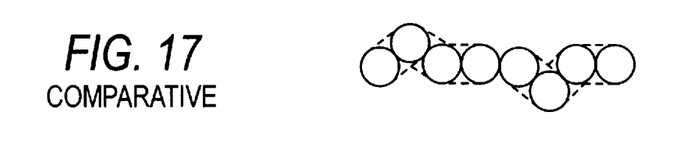

| Tire | Conventional Example 1 | Conventional Example 2 | Comparative Example 1 | Invention Example 1 | Invention Example 2 | Invention Example 3 | Invention Example 4 | Comparative Example 2 | Comparative Example 3 |
|---|---|---|---|---|---|---|---|---|---|
| Cord applied | FIG. 13 | FIG. 14 | FIG. 15 | FIG. 2 | FIG. 6 | FIG. 9 | FIG. 4 | FIG. 16 | FIG. 17 |
| Filament diameter d (mm) | 0.30 | 0.30 | 0.30 | 0.28 | 0.26 | 0.26 | 0.26 | 0.26 | 0.30 |
| Twisting pitch P (mm) | 14.0 | 16.0 | 16.0 | 16.0 | 12.0 | 20.0 | 20.0 | 26.0 | 16.0 |

TABLE 1-continued

| Tire | Conventional Example 1 | Conventional Example 2 | Comparative Example 1 | Invention Example 1 | Invention Example 2 | Invention Example 3 | Invention Example 4 | Comparative Example 2 | Comparative Example 3 |
|---|---|---|---|---|---|---|---|---|---|
| P/d | 56 | 53 | 53 | 57 | 46 | 77 | 77 | 100 | 73 |
| End count (cords/50 mm) | 26.2 | 35.0 | 52.5 | 30.1 | 23.3 | 23.3 | 30.8 | 23.3 | 13.1 |
| Modulus of coating rubber (kgf/mm$^2$) | 35 | 35 | 40 | 45 | 45 | 45 | 45 | 45 | 45 |
| Number of broken cords | 10 | 5 | 10 | 0 | 0 | 0 | 2 | 0 | 10 |
| Crack length (mm) | 5 ~ 10 | 5 ~ 10 | 10 ~ 30 | 5 ~ 15 | 0 ~ 5 | 0 ~ 5 | 5 ~ 10 | 10 ~ 20 | 5 ~ 10 |
| Corrosion length (mm) | 5 ~ 10 | ~5 | 5 ~ 10 | 5 ~ 10 | 5 ~ 10 | 0 ~ 5 | 5 ~ 10 | 30 ~ 50 | 30 ~ 50 |
| Steering stability | 6 | 7 | 9 | 9 | 9 | 9 | 8 | 10 | 7 |
| Ride comfortability | 7 | 7 | 8 | 9 | 9 | 9 | 9 | 5 | 7 |

According to the invention, the steering stability can be improved during the running of the tire while maintaining a high durability, whereby the higher performances of the tire can be attained.

What is claimed is:

1. A pneumatic tire comprising a carcass toroidally extending between a pair of bead portions and a belt arranged outside the carcass in a radial direction of the tire and composed of at least one belt layer, in which said at least one belt layer is constituted by arranging a plurality of steel cords, each cord being formed by twisting 2 to 4 filament bundles each consisting of two steel filaments parallel with each other so as to have a structure that major axes of the filament bundles in the cord are set toward substantially the same direction, in such a manner that the major axes of the filament bundles in the cords of the at least one belt layer arranged substantially in a row in a widthwise direction of the belt.

2. A pneumatic tire according to claim 1, wherein said steel cord has a ratio of twisting pitch of the filament bundle to filament diameter of not less than 50.

3. A pneumatic tire according to claim 1, wherein at least one steel filament in said filament bundle is a wavy steel filament having a wave height H of H$\leq$3d and a wave length L of L$\geq$10d where the filament diameter is d.

4. A pneumatic tire according to claim 1, wherein said steel cord satisfies a feature that a difference between strain at a tensile stress of 23.5 kgf/mm$^2$ and strain at a tensile stress of 1.2 kgf/mm$^2$ is within a range of 0.11–0.25% wherein a tensile stress applied to the cord as a reinforcing member for the tire is within a range of 1.2–23.5 kgf/mm$^2$ during the running of the tire.

5. A pneumatic tire according to claim 1, wherein said steel cords are covered with a coating rubber having a 100% modulus of not less than 40 kgf/mm$^2$.

* * * * *